US007594701B2

(12) United States Patent
Kawabata et al.

(10) Patent No.: US 7,594,701 B2
(45) Date of Patent: Sep. 29, 2009

(54) TROOP SEAT

(75) Inventors: Eric Kawabata, Orange, CA (US);
Charlie VanDruff, Laguna Hills, CA
(US); Michael Duran, Buena Park, CA
(US)

(73) Assignee: Conax Florida Corporation, St. Petersburg, FL (US)

( * ) Notice: Subject to any disclaimer, the term of this patent is extended or adjusted under 35 U.S.C. 154(b) by 454 days.

(21) Appl. No.: 11/061,183

(22) Filed: Feb. 18, 2005

(65) Prior Publication Data
US 2006/0186723 A1      Aug. 24, 2006

(51) Int. Cl.
A47C 9/06      (2006.01)
A47C 4/00      (2006.01)
A47C 15/00     (2006.01)
A47C 7/14      (2006.01)
A47C 7/22      (2006.01)
A47C 13/00     (2006.01)
B60N 2/34      (2006.01)

(52) U.S. Cl. ............... 297/452.63; 297/14; 297/16.1;
297/16.2; 297/63; 297/118; 297/233; 297/248;
297/284.2; 297/452.13; 297/452.56; 297/452.64;
244/118.6; 244/122 R

(58) Field of Classification Search ............... 244/118.6,
244/122 R; 297/233, 16.1, 45, 14, 63, 452.32,
297/284.2, 232, 284.11, 423.36, 353, 118,
297/452.63, 452.13, 452.56, 452.64, 440.1,
297/16.2, 248; 403/322.4; 242/410
See application file for complete search history.

(56) References Cited
U.S. PATENT DOCUMENTS

| 2,556,076 | A |   | 6/1951  | Evans et al. |
| 2,556,077 | A | * | 6/1951  | Fetterly et al. .................. 5/9.1 |
| 2,557,817 | A |   | 12/1951 | Schueder et al. |
| 2,638,151 | A | * | 5/1953  | Jones .......................... 297/359 |
| 2,685,912 | A |   | 8/1954  | Evans et al. |
| 2,700,412 | A |   | 1/1955  | Evans et al. |
| 2,971,566 | A |   | 2/1961  | Negroni |
| 3,057,613 | A | * | 10/1962 | Moss .......................... 267/103 |
| 3,314,720 | A |   | 4/1967  | Millington et al. |
| 3,316,013 | A | * | 4/1967  | Abel et al. ................. 297/16.1 |
| 3,785,600 | A | * | 1/1974  | Padovano ................ 248/188.1 |
| 4,437,629 | A | * | 3/1984  | Roine ..................... 244/122 R |
| 4,514,107 | A | * | 4/1985  | Moreno ....................... 403/230 |
| 4,740,030 | A | * | 4/1988  | Nordskog ................ 297/14 X |
| 4,858,992 | A | * | 8/1989  | LaSota ............... 297/452.63 X |
| 4,994,317 | A | * | 2/1991  | Dugan et al. ................... 442/72 |
| 5,533,788 | A | * | 7/1996  | Nottingham et al. ..... 297/440.1 |
| 5,553,923 | A | * | 9/1996  | Bilezikjian ............... 297/452.2 |
| 5,769,360 | A | * | 6/1998  | Kerbis et al. ............. 244/118.6 |
| 6,152,401 | A | * | 11/2000 | Green ..................... 244/118.6 |
| 6,394,393 | B1| * | 5/2002  | Mort ..................... 244/122 R |
| 6,585,190 | B2| * | 7/2003  | Mort ..................... 244/122 R |
| 6,925,945 | B2| * | 8/2005  | Babick et al. ............. 108/157.1 |
| 2003/0071510 | A1 | * | 4/2003 | Mezger et al. ......... 297/452.63 |
| 2006/0237586 | A1 | * | 10/2006 | Barackman et al. ...... 244/118.6 |

* cited by examiner

Primary Examiner—Rodney B White
Assistant Examiner—Kaitlin A. Wilson
(74) Attorney, Agent, or Firm—GrayRobinson, P.A.; Michael J. Colitz, III

(57) ABSTRACT

Aircrafts troop seating is lightweight and minimizes protruding features on which gear might snag. High strength webbing straps are added to a light weight seat fabric to add strength where strength is required, thus reducing the overall weight. The webbing is of a type used for seatbelts and meets fire regardant requirements. Seat belt style tension adjusters allow adjustment of the seating stretch to improve comfort and crash protection. Internal hardware attachment points are provided to reduce protruding features.

18 Claims, 9 Drawing Sheets

TROOP SEAT

BACKGROUND OF THE INVENTION

The present invention relates to passenger seating and in particular to passenger seating in military fixed wing aircraft and helicopters.

The ability to move quickly to locations all over the Earth is of great military importance. Generally, movement over long distances will be via fixed wing aircraft, and local deployments will be via helicopter. Seats providing safety and light weight are very important. The seat further preferably folds or collapses against the interior of the aircraft fuselage to allow loading of large cargo items.

Various troop seats are know for aircraft. U.S. Pat. No. 2,577,817 for "Foldable Seat," describes a seat suitable for use in an aircraft, with crisscross webbing providing support surfaces. Unfortunately, the openings in the crisscross pattern allow the various items carried by soldiers to become caught, and in an emergency, could create a dangerous situation. The seats of the '817 patent further include protruding seat frame elements (i.e., protuberances) which may further create a likelihood of catching on gear or clothing.

U.S. Pat. No. 2,556,076 for "Troopship Type Airplane Seat Structure," describes folding seats having crisscross webbing for support. Unfortunately, the seats of the '076 patent also have the drawbacks of the '817 patent.

BRIEF SUMMARY OF THE INVENTION

The present invention addresses the above and other needs by providing an aircrafts troop seating which is lightweight and minimizes protruding features on which gear might snag. High strength webbing straps are added to a light weight seat fabric to add strength where strength is required, thus reducing the overall weight. The webbing is of a type used for seatbelts and meets fire retardant requirements. Seat belt style tension adjusters allow adjustment of the seating stretch to improve comfort and crash protection. Internal hardware attachment points are provided to reduce protruding features.

In accordance with one aspect of the invention, there is provided an aircraft troop seating including a rear longitudinal support mechanically connected to a bulkhead, a front longitudinal support, lateral supports connecting the rear longitudinal support and the front longitudinal support, and vertical supports supporting the front longitudinal support above a floor. Seating fabric resides between the rear longitudinal support and the front longitudinal support, wherein the seating fabric comprises a light weight seat fabric reinforced by spaced apart webbing straps running between the rear longitudinal support and the front longitudinal support. Internal hardware resides inside the front longitudinal support, wherein the vertical supports are connected to the front longitudinal supports by attaching to the internal hardware, thereby reducing protruding features.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 14 A is a cross-sectional view of the internal bolt and bolt carrier taken along line 14A-14A of FIG. 14.

FIG. 14 B is a cross-sectional view of the internal bolt and bolt carrier taken along line 14B-14B of FIG. 14A with the internal bolt extending from the bolt carrier.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
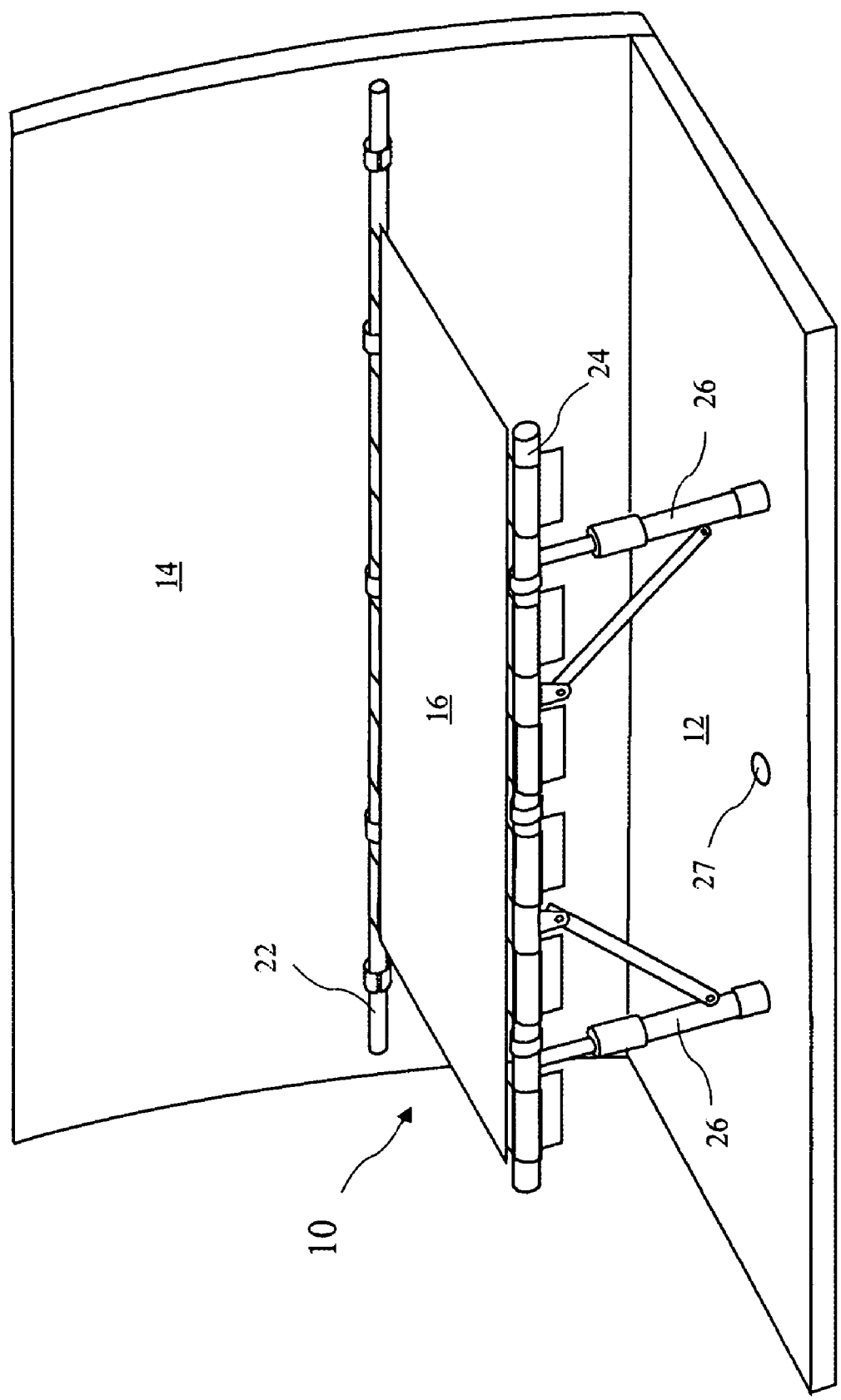
FIG. 1 is a three man troop seat according to the present invention.

A three man troop seat 10 according to the present invention is shown in FIG. 1. The troop seat 10 includes a seating area 16 comprising a lightweight seat fabric, a rear longitudinal support 22 attached to a bulkhead 14, and a front longitudinal support 24 supported above a floor 12 by vertical supports 26. An unused vertical support receiver 27 resides in the floor 12.

Figure 2:
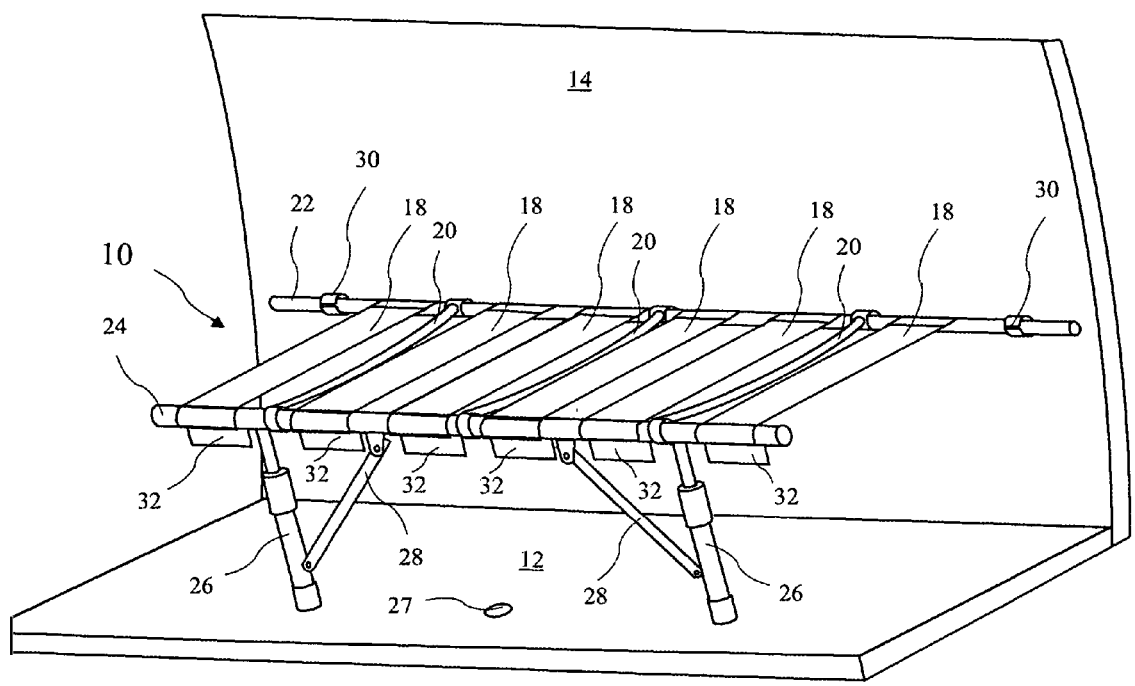
FIG. 2 depicts the three man troop seat with a light weight seat fabric cut away to show high strength webbing straps used to reinforce the light weight fabric.

The three man troop seat 10 is shown in FIG. 2 with the light weight seat fabric cut away to show high strength webbing straps 18 used to reinforce the seating area 16 (see FIG. 1). Tensioner pulls 32 are provided for each webbing strap 18 to allow adjustment of the seating stretch to improve comfort and crash protection. Lateral supports 20 connect the rear longitudinal support 22 to the front longitudinal support 24. The rear longitudinal support 22 is mechanically connected to the bulkhead 14 by bulkhead attachments 30. The vertical supports 26 removably connect to vertical support receivers 27 using claws which grasp mating surfaces in the vertical support receivers 27. The vertical supports include external sleeves which are actuated to retract the claws and allow the vertical supports 26 to be withdrawn from the vertical support receivers. Each of the two vertical supports 26 are braced by a diagonal support 28. The diagonal supports 28 are pivotally mounted to the front longitudinal support 24 at pivots attached to the front longitudinal support 24, and to the vertical supports 26 using quick release pins.

Figure 3:
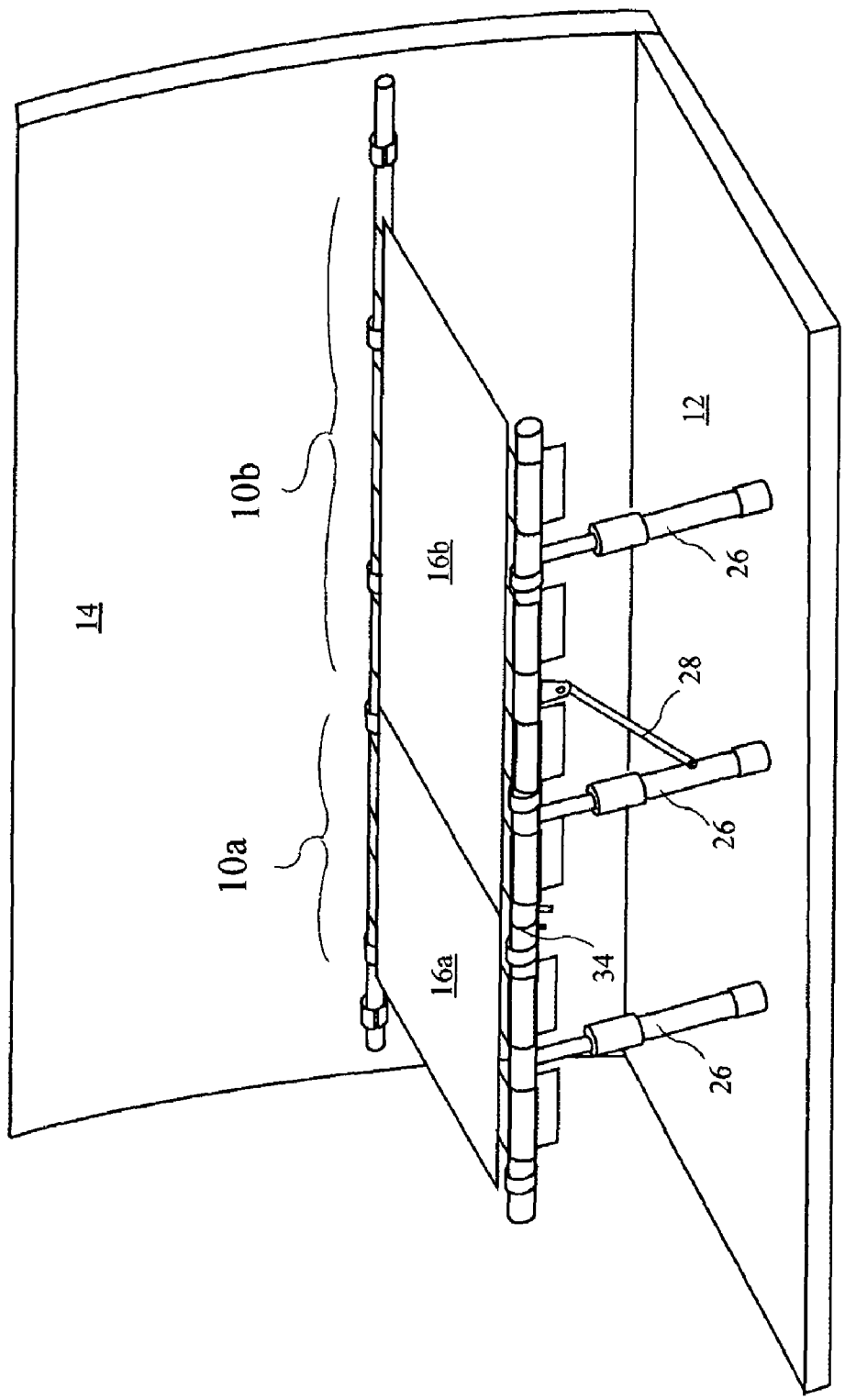
FIG. 3 shows a one man troop seat according to the present invention attached to a two man troop seat according to the present invention.

A one man troop seat 10a according to the present invention is shown attached to a two man troop seat 10b according to the present invention in FIG. 3. The one man troop seat 10a has a first seating area 16a and is supported by a single vertical support 26. The two man troop seat 10b has a second seating area 16b and is supported by two vertical supports 26. One of the two vertical supports 26 supporting the two man seat 10b, is braced by one diagonal support 28.

Figure 4:
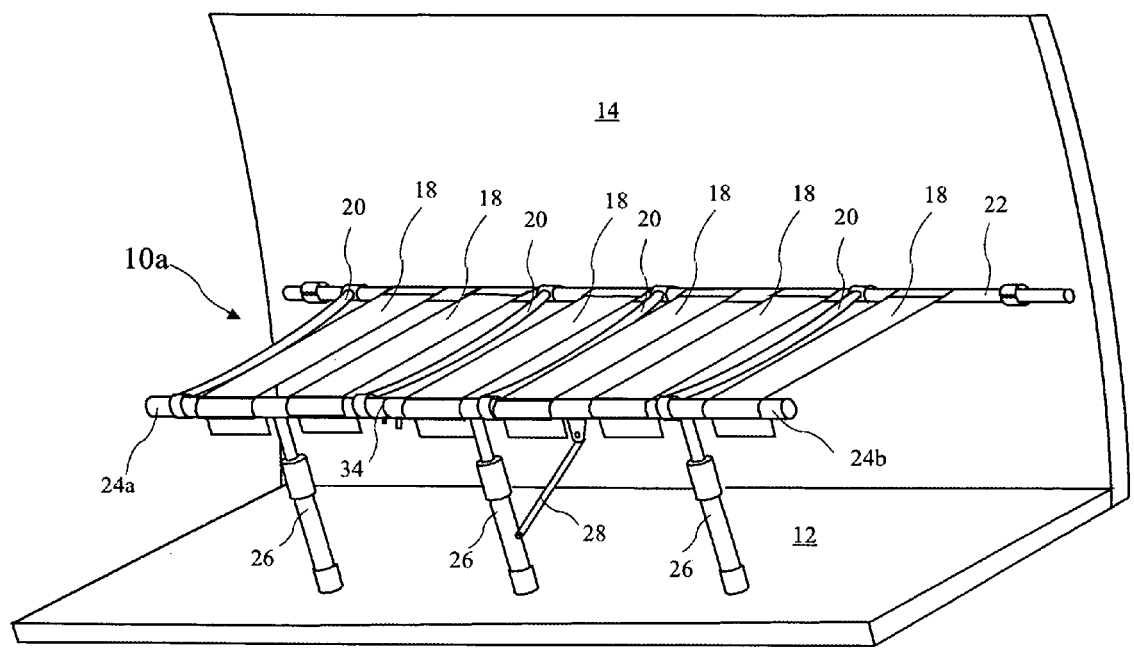
FIG. 4 depicts the one man troop seat and the attached two man troop seat with the light weight seat fabric cut away to show the high strength webbing straps used to reinforce the light weight fabric.

The one man troop seat 10a and the attached two man troop seat 10b with the light weight seat fabric cut away to show the high strength webbing straps 18 used to reinforce the light weight fabric are shown in FIG. 4. The one man troop seat 10a includes a first front longitudinal support 24a and the two man troop seat 10b includes a second front longitudinal support 24b. The first front longitudinal support 24a and the second front longitudinal support 24b meet at separation 34.

Figure 5A:
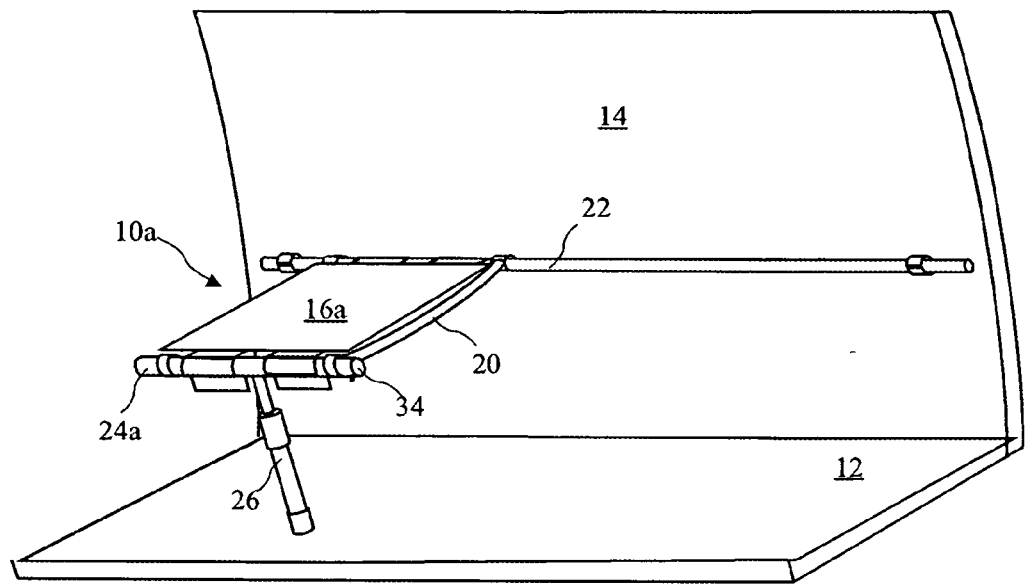
FIG. 5A shows the one man troop seat with the two man troop seat removed.
Figure 5B:
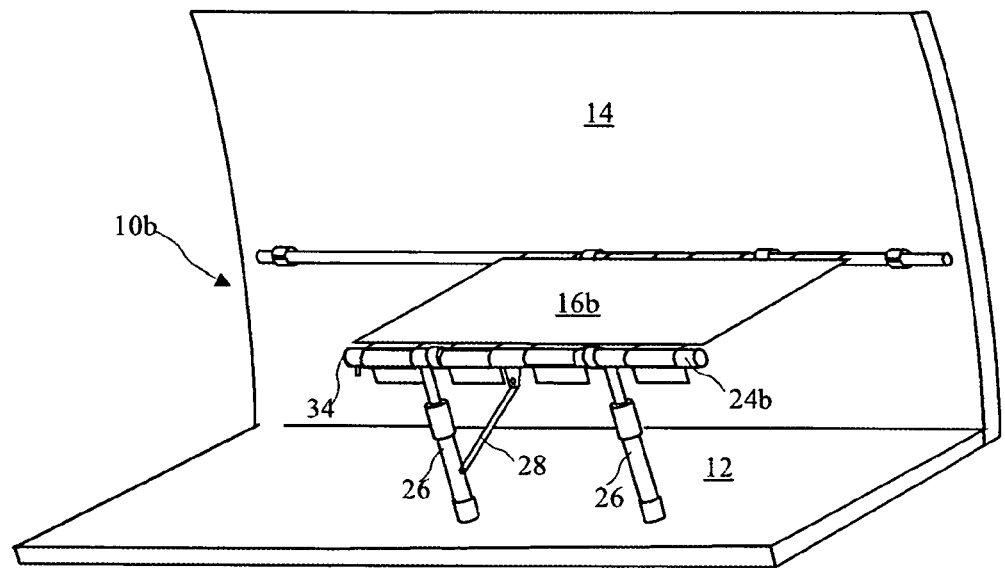
FIG. 5B shows the two man troop seat with the one man troop seat removed.

The one man troop seat 10a is shown alone (with the two man troop seat 10b not shown) in FIG. 5A, and the two man troop seat 10b is shown alone (with the one man troop seat 10a not shown) in FIG. 5B. The one man troop seat 10a and/or the two man troop seat 10b may be collapsed or folded independently, thereby providing addition room for large equipment.

Figure 6A:
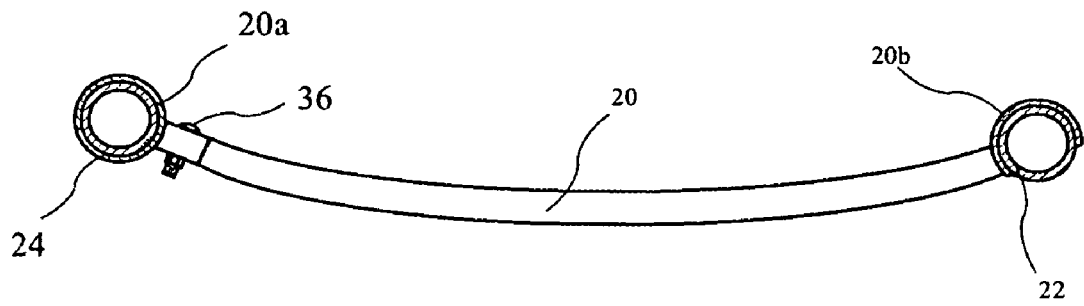
FIG. 6A shows a side view of a lateral support member of the troop seats.
Figure 6B:
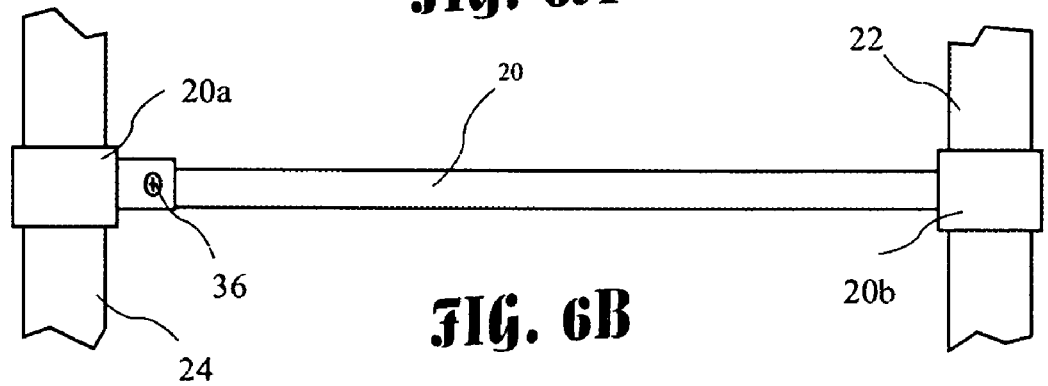
FIG. 6B shows a top view of the lateral support member of the troop seats.

A side view of the lateral support member 20 of the troop seats 10, 10a, or 10b is shown in FIG. 6A, and a top view of the lateral support member 20 is shown in FIG. 6B. The lateral support member 20 is connected to the rear longitudinal support 22 by a "C" shaped support end 20b, and the longitudinal support member 20 is connected to the front longitudinal support 24 by a pivoting support end 20a. The lateral support member 20 pivots about a pin or screw 36 in the support end 20a.

Figure 6C:
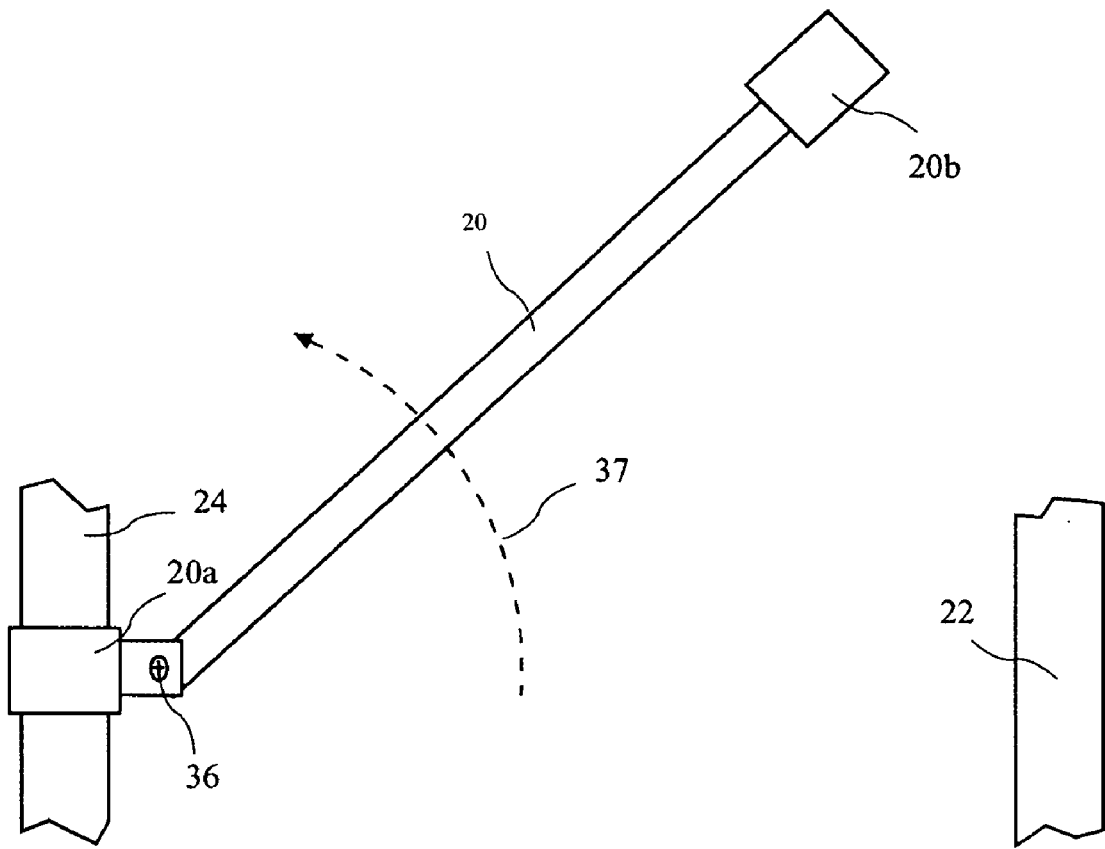
FIG. 6C shows a top view of the lateral support member of the troop seats swung away to allow the troop seat to the collapsed.

A top view of the lateral support member 20 swung away from the rear longitudinal support member 22 is shown in FIG. 6C. The lateral support member 20 pivots along an arc 37 about a pivot 36 in support end 20a to allow the troop seat 10, 10a, or 10b to the folded or collapsed. The pivot 36 preferably comprises a screw and nut. The support end 20b preferably may be lifted to detach the lateral support member 20 from the rear longitudinal support member 22.

Figure 7:
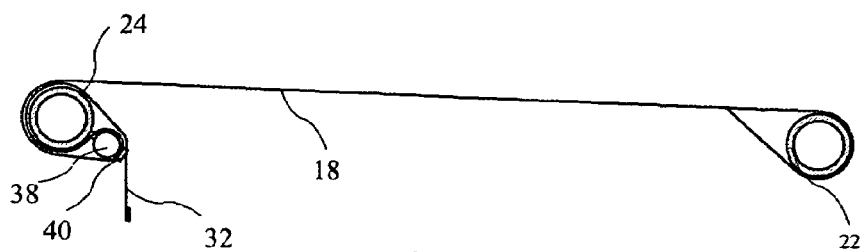
FIG. 7 is a side view of the high strength webbing attached to a rear longitudinal support and to a front longitudinal support including a tensioner.
Figure 8:
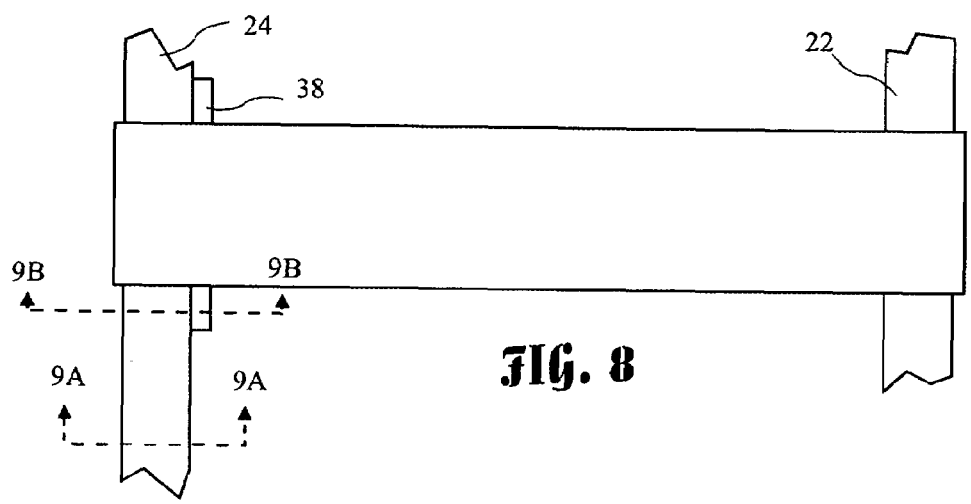
FIG. 8 is a top view of the high strength webbing attached to the rear longitudinal support and to the front longitudinal support including the tensioner.

A side view of the high strength webbing 18 attached to the rear longitudinal support 22 and to the front longitudinal support 24 is shown in FIG. 7. The webbing straps 18 preferably wraps around the rear longitudinal support 22 and is sewn in place. A top view of the high strength webbing 18 attached to the rear longitudinal support 22 and to the front longitudinal support 24 is shown in FIG. 8. The webbing 18 is preferably a Kevlar® weave. Preferred widths are approximately 5.5 inches for the three man seat 10, approximately five inches for the two man seat 10b, and approximately four inches for the one man seat 10a. A suitable webbing is part number MODIFIED 4856 available from Bally Ribbon Mills in Bally, Pa. A suitable seat back and/or bottom material is Conex® or Kevlar® fabric part number 3049B available from Sherman Textile Co. in Dallas, N.C.

Figure 9A:
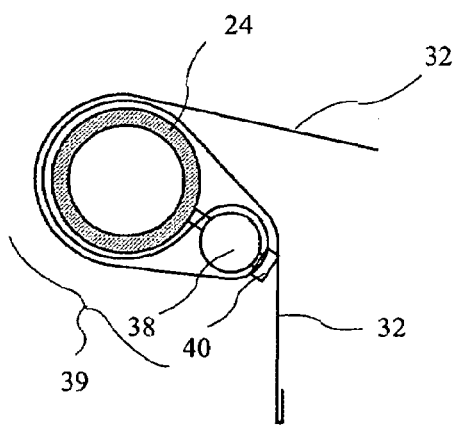
FIG. 9A is a cross-sectional view of the front longitudinal support and tensioner taken along line 9A-9A of FIG. 8.
Figure 9B:
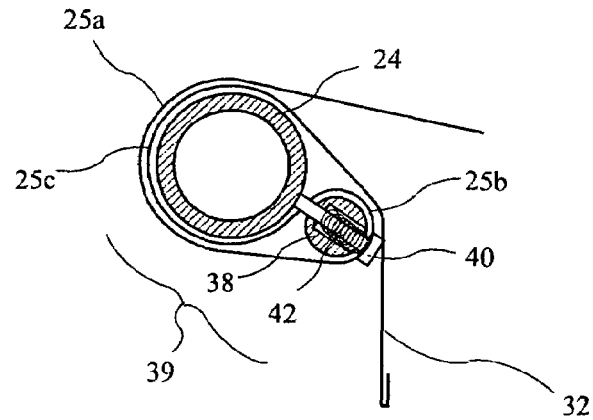
FIG. 9B is a cross-sectional view of the front longitudinal support and tensioner taken along line 9B-9B of FIG. 8.

A cross-sectional view a tensioner assembly 39 taken along line 9A-9A of FIG. 8 are shown in FIG. 9A and a second cross-sectional view of the tensioner assembly 39 taken along line 9B-9B of FIG. 8 is shown in FIG. 9B. The tensioner assembly 39 comprises strap take-up apparatus including a portion of the front longitudinal support 24, a tensioner drum 38, and a tensioner portion of the high strength webbing 18. The tensioner portion of the high strength webbing 18 resides proximal to the front longitudinal support 24 and comprising an outer wrap 25a, a drum wrap 25b, an inner wrap 25c, and the tensioner pull 32. The outer wrap 25a connecting to (or continues from) the seating portion of the high strength webbing 18 and wraps partially around the outside of the front longitudinal support 24. The drum wrap 25b connecting to (or continues from) the outer wrap 25a and wraps partially around the tensioner drum 38. The inner wrap 25c connecting to (or continues from) the drum wrap 25b and wraps partially around the front longitudinal support 24 residing between the front longitudinal support 24 and the outer wrap 25a. The tensioner pull 32 connects to (or continues from) the inner wrap 25c and falls over the tensioner drum 38.

The tensioner drum 38 is connected to the front longitudinal support by tensioner screws 40, and tensioner springs 42 reside over the tensioner screws 40 to urge the tensioner drum 38 towards the front longitudinal support 24. The tensioner assembly 39 is similar to known seat belt tensioners, wherein pulling in the tensioner pull 32 causes the high strength webbing 18 to advance through the tensioner assembly 39, thereby tightening the seating area 16 (see FIGS. 1 and 3). The tensioners are a self-binding arrangement wherein the webbing is wrapped (or "looped") around itself on the longitudinal support, thereby creating a binding (or locking) effect that increases with applied loads. The greater the applied load results in a greater binding effect.

Figure 10:
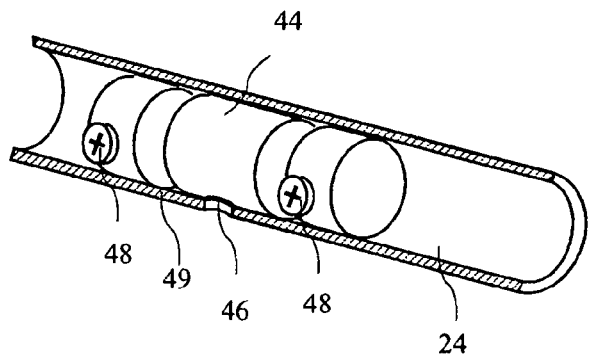
FIG. 10 is a cutaway view of internal hardware residing in the front longitudinal support.

A cutaway view of internal hardware 44 residing in the front longitudinal support 24 is shown in FIG. 10. The internal hardware 44 provides the ability to attach various members such as the vertical supports 26, the lateral supports 20, the diagonal supports 28 (see FIGS. 2 and 4) and the like to the front longitudinal support 24, or to any other tubular support. The internal hardware 44 is held in place by hardware screws 48 passing through a wall 49 of the front longitudinal support 24 and into the internal hardware 44. An access passage 46 allows mounting screws to pass through the wall 49 and into the internal hardware to attach the various supports. The vertical supports 26, the lateral supports 20, and the diagonal supports 28 generally are attached using a bracket, for example, the pivoting support end 20a in FIGS. 6A, 6B, and 6C, to the front longitudinal support 24, or other structure. In these cases, the bracket is attached to the front longitudinal support 24 using the internal hardware. The diagonal supports 28 may also be attached to the vertical supports 26 using the internal hardware 44 residing in the vertical supports 26. The internal hardware may thus be utilized for any connection of support elements of the troop seat 10, 10a, or 10b in order to reduce protruding features, and any troop seat using internal hardware to reduce protruding features is intended to come within the scope of the present invention.

Figure 11:
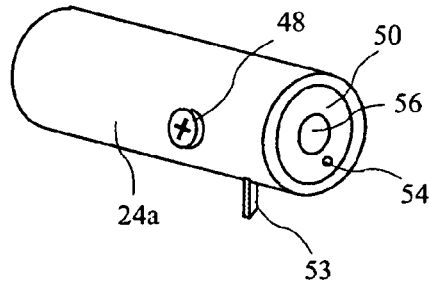
FIG. 11 is a perspective view of a female end of a first front longitudinal support of the one man troop seat.

A perspective view of a female end of the first front longitudinal support 24a (see FIG. 5A) of the one man troop seat 10a is shown in FIG. 11. A hardware screw 48 passes through the wall 49 and into a mating receiver 50 residing inside the front longitudinal support 10a. The mating receiver 50 has a mouth 56 and a latch 52 (see FIG. 12B) which pivots about a latch pivot 54, which latch 52 has a latch handle 53.

Figure 11A:
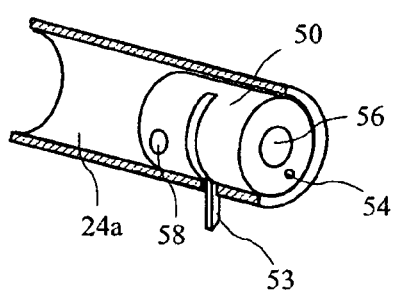
FIG. 11A is a cutaway perspective view of the female end of the first front longitudinal support of the one man troop seat.

A cutaway perspective view of the female end of the front longitudinal support 24a of the one man troop seat 10a is shown in FIG. 11A. The mating receiver 50 is substantially cylindrical and has a threaded hole 58 for the hardware screw 48 to threadedly cooperate with.

Figure 11B:
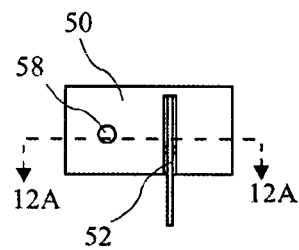
FIG. 11B is a side view of a mating receiver adapted to reside in the female end of the first front longitudinal support of the one man troop seat.
Figure 11C:
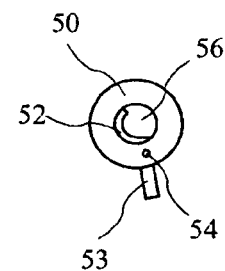
FIG. 11C is an end view of the mating receiver adapted to reside in the female end of the first front longitudinal support of the one man troop seat.

A side view of a mating receiver 50 is shown in FIG. 11B, and an end view of the mating receiver 50 is shown in FIG. 11C. A portion of the latch 52 is seen to intrude into the mouth 56.

Figure 12A:
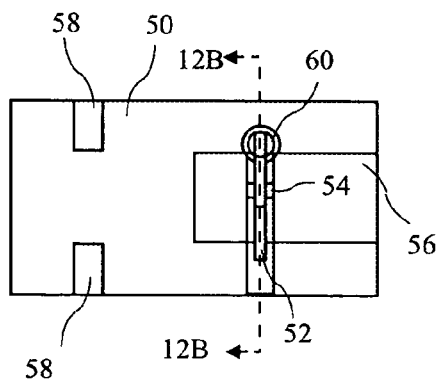
FIG. 12A is a cross-sectional view of the mating receiver taken long line 12A-12A of FIG. 11B.

A cross-sectional view of the mating receiver 50 taken long line 12A-12A of FIG. 11B is shown in FIG. 12A. The latch 52 pivots about the latch pivot 54, and is biased in a latched position by a latch spring 60. Two opposing threaded holes 58 allow attachment of the mating receiver 50 to the front longitudinal support 24a.

Figure 12B:
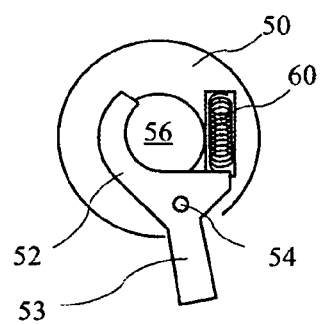
FIG. 12B is a cross-sectional view of the mating receiver taken long line 12B-12B of FIG. 12A.
Figure 12C:
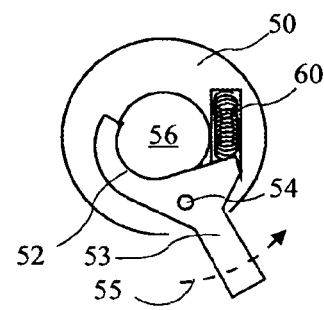
FIG. 12C is a cross-sectional view of the mating receiver in the unlatched position.

A cross-sectional view of the mating receiver 50 taken long line 12B-12B of FIG. 12A is shown in FIG. 12B with the latch 52 in a latched position, and a second cross-sectional view of the mating receiver 50 taken long line 12B-12B of FIG. 12A is shown in FIG. 12C with the latch 52 in an unlatched position. The latch 52 is biased toward the latched position by the latch spring 60, and actuation of the latch handle 53 along arc 55 moves the latch 55 to the unlatched position.

Figure 13:
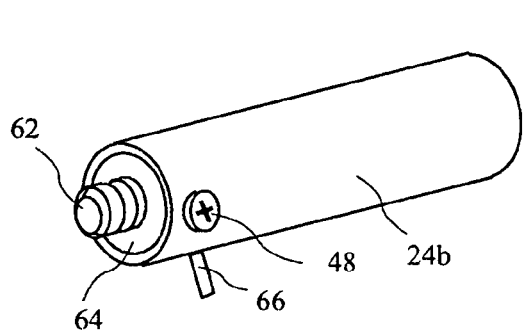
FIG. 13 is a perspective view of an internal bolt residing in a male end of a second front longitudinal support.

A perspective view of a male end of the second longitudinal support 24b having an internal bolt 62 and bolt carrier 64 residing in a male end of a second front longitudinal support 24b is shown in FIG. 13. The hardware screw 48 holds the bolt carrier 64 in place.

Figure 13A:
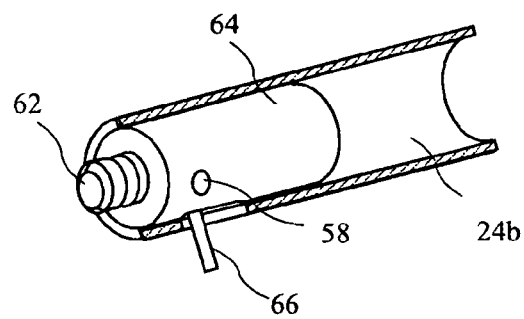
FIG. 13A is a cutaway perspective view of the internal bolt residing in the male end of the second front longitudinal support.

A cutaway perspective view of the internal bolt 62 and bolt carrier 64 residing in the male end of the second front longitudinal support 24b is shown in FIG. 13A. A bolt handle 66 is provided to move the internal bolt 62 axially within the bolt carrier 64.

Figure 14:
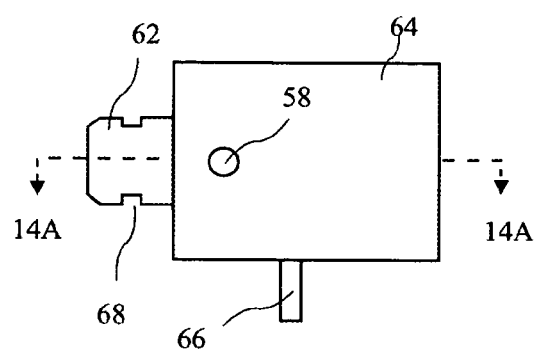
FIG. 14 is a side view of the internal bolt extending from a bolt carrier.
Figure 14A:
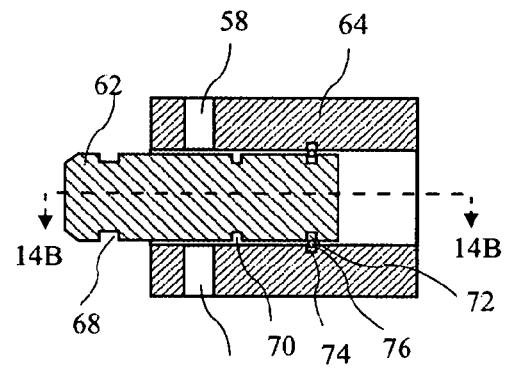
FIG. 14C is a cross-sectional view of the internal bolt and bolt carrier taken along line 14C-14C of FIG. 14A with the internal bolt retracted into the bolt carrier.

A side view of the internal bolt 62 extending from the bolt carrier 64 is shown in FIG. 14. A cross-sectional view of the internal bolt 62 and bolt carrier 64 taken along line 14A-14A of FIG. 14 is shown in FIG. 14A. Two opposing threaded holed 58 are provided to attach the bolt carrier 64 to the front longitudinal support 24b.

Figure 14B:
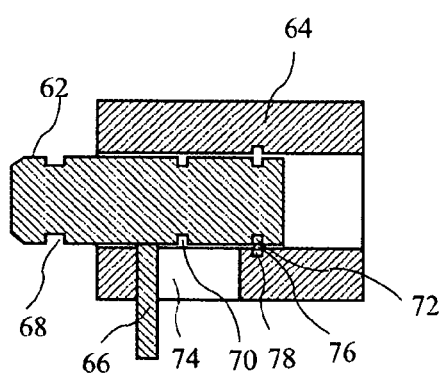
Figure 14C:
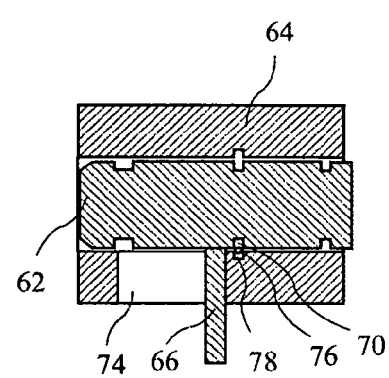

A cross-sectional view of the internal bolt 62 and bolt carrier 64 taken along line 14B-14B of FIG. 14A is shown in FIG. 14B, with the internal bolt 62 extending from the bolt carrier 64, and a cross-sectional view of the internal bolt 62 and bolt carrier 64 taken along line 14C-14C of FIG. 14A is shown in FIG. 14C with the internal bolt 62 retracted into the bolt carrier 64. The bolt carrier 64 includes a passageway groove 78, and a bolt clip 76 resides in the passageway groove 78. The bolt clip 76 is a common retaining ring. The bolt 62 includes a latching feature comprising a bolt channel 68 for cooperation with the latch 52 (see FIGS. 12B and 12C). When the bolt 62 is inserted into the mouth 56 (see FIG. 12A) and the latch 52 is in the latched position (FIG. 12B), the latch 52 holds the bolt 62 in the mouth 56. When the latch 52 is in the unlatched position (FIG. 12C), the bolt 62 is free to move into and out of the mouth 56.

The internal bolt 62 further includes a first bolt groove 70 and a second bolt groove 72. When the internal bolt 62 is in the extended position (FIG. 14B), the bolt clip 76 cooperates with the second bolt groove 72 to urge the internal bolt 62 to remain in the extended position. When the internal bolt 62 is in the retracted position (FIG. 14C), the bolt clip 76 cooperates with the second bolt groove 72 to urge the internal bolt 62 to remain in the retracted position.

While the invention herein disclosed has been described by means of specific embodiments and applications thereof, numerous modifications and variations could be made thereto by those skilled in the art without departing from the scope of the invention set forth in the claims.

We claim:

1. Aircraft troop seating for accommodating a number of individuals, the seating comprising:
    a rear longitudinal support mechanically connected to a bulkhead;
    a front longitudinal support;
    lateral supports connecting the rear longitudinal support and the front longitudinal support;
    vertical supports supporting the front longitudinal support above a floor; and
    a series of spaced apart flame resistant webbing straps, the webbing straps positioned between the rear longitudinal support and the front longitudinal support and running parallel to the lateral supports;
    seating fabric positioned between the rear longitudinal support and the front longitudinal support, wherein the seating fabric comprises a light weight seat fabric reinforced by the series of spaced apart webbing straps
    a series of mechanical tension adjusters interconnected to the front longitudinal support, wherein each of the webbing straps is threaded through a corresponding tension adjuster, each tension adjuster including a tensioner pull, whereby an operator can pull on the tensioner pull to cause the webbing strap to advance through the tension adjuster.

2. The aircraft troop seating of claim 1, wherein the tension adjuster comprises a self-binding arrangement wherein the webbing is wrapped around itself on the longitudinal support, thereby creating a binding effect which increases with applied loads.

3. Aircraft troop seating comprising:
    a rear longitudinal support mechanically connected to a bulkhead;
    a front longitudinal support;
    lateral supports connecting the rear longitudinal support and the front longitudinal support;
    vertical supports supporting the front longitudinal support above a floor; and
    seating fabric positioned between the rear longitudinal support and the front longitudinal support, wherein the seating fabric comprises a light weight seat fabric reinforced by spaced apart webbing straps comprising flame resistant webbing running between the rear longitudinal support and the front longitudinal support;
    wherein tension adjusters are attached to the front longitudinal support and include a tensioner drum that is positioned parallel to the front longitudinal support and is mechanically attached to the front longitudinal support;
    and wherein tension adjusters further include an outer wrap connected to the webbing strap and wrapping partially around the outside of the front longitudinal support;
    a drum wrap connected to the outer wrap and wrapping partially around the tensioner drum;
    an inner wrap connected to the drum wrap and wrapping partially around the front longitudinal support between the front longitudinal support and the outer wrap; and
    a tensioner pull connected to the inner wrap and falling over the tensioner drum.

4. The aircraft troop seating of claim 3, wherein the tensioner drum is connected to the front support member by tensioner screws, wherein tensioner springs reside over the tensioner screws and bias the tensioner drum towards the front longitudinal support.

5. The aircraft troop seating of claim 1, wherein:
the front longitudinal support is a hollow front longitudinal support: and
internal hardware positioned inside the front longitudinal support at attachment points of the vertical supports for strengthening the hollow front longitudinal support.

6. Aircraft troop seating comprising:
a rear longitudinal support mechanically connected to a bulkhead;
a first front longitudinal support connectable to the rear longitudinal support;
a second front longitudinal support connectable to the rear longitudinal support and further connectable to the first front longitudinal support to create a long seat and detachable from the first front longitudinal support to create a shorter seat;
lateral supports connectable between the rear longitudinal support and the front longitudinal supports;
at least one vertical support supporting the front longitudinal supports above a floor; and
seating fabric positioned between the rear longitudinal support and the front longitudinal supports,
wherein the first front longitudinal support connects end to end with the second front longitudinal support to create a single continuous seat.

7. The aircraft troop seating of claim 6, further comprising:
an internal receiver positioned within a female end of the first front longitudinal support; and
an internal bolt residing in a male end of the second front longitudinal support, wherein the internal bolt cooperates with the internal receiver to detachably attach the first front longitudinal support to the second front longitudinal support.

8. The aircraft troop seating of claim 7, wherein the internal bolt includes a latching feature, and wherein the internal receiver includes:
a mouth for receiving the internal bolt; and
a latch positioned within the mouth,
wherein the latch cooperates with the latching feature to hold the external bolt in the mouth.

9. The aircraft troop seating of claim 8, wherein:
the internal bolt resides in a bolt carrier;
the bolt carrier positioned within the male end of the second front longitudinal support; and
the internal bolt slides between an extended position wherein the internal bolt extends from the male end, and a retracted position wherein the internal bolt is substantially contained within the second front longitudinal support.

10. The aircraft troop seating of claim 9, wherein:
the bolt carrier includes a bolt passageway;
the internal bolt slides within the bolt passageway; and
a bolt clip positioned within the bolt passageway, wherein the bolt clip cooperates with the internal bolt to hold the internal bolt in the extended position and in the retracted position.

11. The aircraft troop seating of claim 10, wherein:
the internal bolt includes a first bolt groove and a second bolt groove, which grooves are circumferential grooves;
the bolt passageway includes a passageway groove; and
the bolt clip is a C clip positioned within the passageway groove.

12. The aircraft troop seating of claim 8, wherein:
the latch pivots on a latch pivot;
the latch is biased in a latched position by a latch spring; and
the latch includes a latch handle extending from the first front longitudinal support, wherein the internal bolt may be released from the latch by moving the latch handle.

13. The aircraft troop seating of claim 6, wherein the seating fabric comprises a light weight seat fabric reinforced by spaced apart webbing straps running between the rear longitudinal support and front longitudinal support.

14. Aircraft troop seating comprising:
a rear longitudinal support mechanically connected to a bulkhead;
a hollow front longitudinal support;
lateral supports connecting the rear longitudinal support and the front longitudinal support;
vertical supports supporting the front longitudinal support above a floor;
seating fabric positioned between the rear longitudinal support and the front longitudinal support, wherein the seating fabric comprises a light weight seat fabric reinforced by spaced apart webbing straps running between the rear longitudinal support and the front longitudinal support; and
internal hardware comprising at least one cylindrical body residing inside the hollow front longitudinal support, wherein the cylindrical body is connected to the front longitudinal support by at least one screw passing through a wall of the front longitudinal support and into a threaded hole in the cylindrical body at attachment points of the vertical supports for strengthening the hollow front longitudinal support.

15. The aircraft troop seating of claim 14 further including tension adjusters comprising strap take-up apparatus residing at one of the longitudinal supports for adjusting the tension of each of the webbing straps.

16. The aircraft troop seating of claim 14, further comprising:
a one man seat; and
a two man seat attachable to the one man seat;
a first front longitudinal support of the one man troop seat;
a second front longitudinal support of the two man troop seat;
an internal receiver positioned within a female end of the first front longitudinal support; and
an internal bolt residing in a male end of the second front longitudinal support, wherein the internal bolt cooperates with the internal receiver to detachably attach the one man seat to the two man seat.

17. The aircraft troop seating of claim 6, wherein the lateral supports are pivotally attached to the front longitudinal supports and detachably attached to the rear longitudinal support.

18. The aircraft troop seating of claim 17, wherein the lateral supports include a "C" shaped support end for engaging the rear longitudinal support to attach the lateral supports to the rear longitudinal support.

* * * * *